(12) United States Patent
Cantoro (10) Patent No.: US 9,019,725 B2
(45) Date of Patent: Apr. 28, 2015

(54) CONTROL DEVICE FOR A RESONANT CONVERTER

(75) Inventor: Claudio Cantoro, Cornaredo (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 378 days.

(21) Appl. No.: 13/531,150

(22) Filed: Jun. 22, 2012

(65) Prior Publication Data

US 2012/0327692 A1   Dec. 27, 2012

(30) Foreign Application Priority Data

Jun. 24, 2011   (IT) .............................. MI2011A1156

(51) Int. Cl.
*H02M 3/335* (2006.01)
*H02M 3/338* (2006.01)
*H02M 1/00* (2006.01)

(52) U.S. Cl.
CPC .... *H02M 3/3387* (2013.01); *H02M 2001/0003* (2013.01); *Y02B 70/1433* (2013.01)

(58) Field of Classification Search
USPC ....................... 363/21.02–21.03, 21.04, 21.12
See application file for complete search history.

(56) References Cited

U.S. PATENT DOCUMENTS

| | | | |
|---|---|---|---|
| 6,018,467 A | 1/2000 | Majid et al. | |
| 6,351,401 B1 * | 2/2002 | Scheel et al. | 363/98 |
| 6,822,881 B2 * | 11/2004 | Elferich | 363/21.02 |
| 7,313,004 B1 | 12/2007 | Yang et al. | |
| 7,800,928 B1 * | 9/2010 | Dernovsek et al. | 363/132 |
| 8,670,255 B2 * | 3/2014 | Gong et al. | 363/89 |
| 2005/0265058 A1 * | 12/2005 | Stevanovic et al. | 363/131 |
| 2009/0196074 A1 * | 8/2009 | Choi | 363/21.02 |
| 2009/0251926 A1 | 10/2009 | Choi et al. | |

OTHER PUBLICATIONS

Jin et al., "Multiphase LLC Series Resonant Converter for Microprocessor Voltage Regulation," Industry Applications Conference, 2006, 41st IAS Annual Meeting, vol. 5., pp. 2136-2143, Oct. 8-12, 2006.
Nalbant, "A New and Improved Control Technique Greatly Simplifies the Design of ZVS Resonant Inverters and DC/DC Power Supplies," Tenth Annual Applied Power Electronics Conference and Exposition, 1995, (APEC '95), vol. 2, pp. 694-701, Mar. 5-9, 1995.

* cited by examiner

*Primary Examiner* — Adolf Berhane
*Assistant Examiner* — Henry Lee, III
(74) *Attorney, Agent, or Firm* — Seed IP Law Group PLLC

(57) ABSTRACT

A control device for a resonant converter is described. The converter comprises a switching circuit adapted to drive a resonant circuit that includes at least one capacitor. The converter is adapted to convert an input signal into an output signal and the switching circuit includes at least a half bridge of first and second switches, the central point of said half bridge being connected to the resonant circuit. The control device comprises a controller adapted to generate at least a control signal of the switching circuit by comparing a signal representative of the energy of the resonant circuit with at least another signal.

25 Claims, 5 Drawing Sheets

CONTROL DEVICE FOR A RESONANT CONVERTER

BACKGROUND

1. Technical Field

The present disclosure relates to a control device for a resonant converter.

2. Description of the Related Art

Forced switching converters (switching converters) with devices used for controlling them are known from the state of the art. Resonant converters are a wide range of forced switching converters characterized by the presence of a resonant circuit playing an active role in determining the input-output power flow. In these converters, a bridge (half bridge) consisting of four (two) power switches (typically power MOFSETs) supplied by a direct voltage generates a voltage square wave that is applied to a resonant circuit tuned to a frequency close to the fundamental frequency of said square wave. Thereby, because of the selective features thereof, the resonant circuit mainly responds to the fundamental component and negligibly to the higher-order harmonics of the square wave. As a result, the circulating power may be modulated by changing the frequency of the square wave, holding the duty cycle constant at 50%. Moreover, depending on the resonant circuit configuration, the currents and/or voltages associated with the power flow have a sinusoidal or a piecewise sinusoidal shape.

These voltages are rectified and filtered so as to provide dc power to the load. In offline applications, to comply with safety regulations, the rectification and filtering system supplying the load is coupled to the resonant circuit by a transformer providing the isolation between source and load, required by the above-mentioned regulations. As in all isolated network converters, also in this case a distinction is made between a primary side (as related to the primary winding of the transformer) connected to the input source and a secondary side (as related to the secondary winding(s) of the transformer) providing power to the load through the rectification and filtering system.

Figure 1:
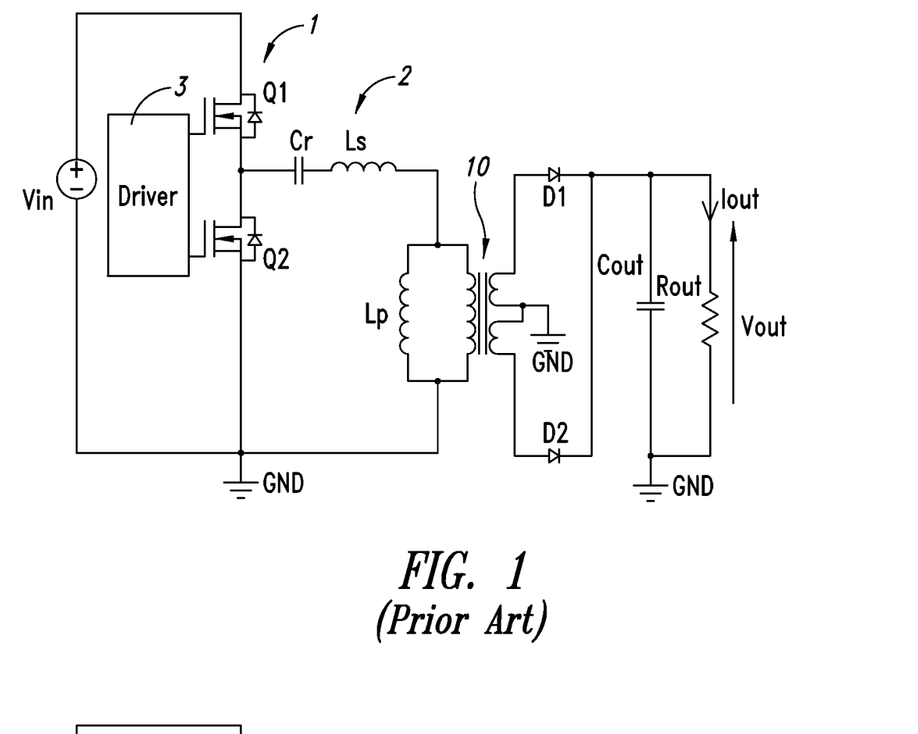
FIG. 1 shows a circuit schematic of a LLC resonant converter in accordance with the prior art.

Presently, among the many types of resonant converters, the so-called LLC resonant converter is widely used, especially in the half bridge version thereof. The designation LLC comes from the resonant circuit employing two inductors (L) and a capacitor (C); a principle schematic of an LLC resonant converter is shown in FIG. 1. The resonant converter 1 comprises a half bridge of transistors Q1 and Q2 between the input voltage Vin and the ground GND driven by a driving circuit 3. The common terminal HB between the transistors Q1 and Q2 is connected to a circuit block 2 comprising a capacitor Cr, an inductance Ls and another inductance Lp connected in parallel to a transformer 10 with a center-tap secondary. The two windings of the center-tap secondary of transformer 10 are connected to the anodes of two diodes D1 and D2 the cathodes of which are both connected to the parallel of a capacitor Cout and a resistance Rout; the voltage across the parallel Rout, Cout is the output voltage Vout of the resonant converter, while the dc output current Iout flows through Rout.

Resonant converters offer considerable advantages as compared to the traditional switching converters (non-resonant converters, typically PWM—Pulse Width Modulation—controlled): waveforms without steep edges, low switching losses in the power switches due to the "soft" switching thereof, high conversion efficiency (>95% is easily reachable), ability to operate at high frequencies, low EMI (Electro Magnetic Interference) generation and, ultimately, high power density (i.e., enabling to build conversion systems capable of handling considerable power levels in a relatively small space).

As in most dc-dc converters, a closed-loop, negative-feedback control system keeps the output voltage of the converter constant upon changing the operating conditions, i.e., the input voltage Vin and/or the output current Iout thereof. This is achieved by comparing a portion of the output voltage to a reference voltage Vref. The difference, or error signal Er, between the value provided by the output voltage sensing system (usually, a resistor divider) and the reference value is amplified by an error amplifier. Its output Vc modifies a quantity x inside the converter which the energy carried by the converter during each switching cycle substantially depends on. As discussed above, such a significant quantity in resonant converters is the switching frequency of the square wave stimulating the resonant circuit.

As in all control systems in dc-dc converters, the frequency response of the error amplifier should be properly designed so as to ensure:

a stable control loop (i.e., that, upon disturbances of the operating conditions of the converter, once the transient caused by the disturbance has finished, the output voltage tends to recover a steady state value close to that before the disturbance;

good regulation (i.e., the new constant value recovered by the output voltage following a disturbance is very close to that preceding the perturbation);

good dynamic performance (i.e., during the transient following a disturbance, the output voltage does not excessively deviate from the desired value and the transient itself is short).

The above-mentioned control objectives may be expressed in terms of some characteristic quantities of the transfer function of the control loop, such as the band width, the phase margin, the dc gain. In a dc-dc converter, these objectives may be achieved by acting on the frequency response of the error amplifier, modifying the gain thereof and conveniently placing the poles and zeroes of the transfer function thereof (frequency compensation). This is normally achieved by using passive networks comprising resistances and capacitors of appropriate value connected thereto.

However, in order to determine the frequency compensation used to obtain the desired features of the transfer function of the control loop, one should know both the modulator gain, i.e., the gain of the system converting the control voltage Vc into the control quantity x, and the frequency response of the converter itself to the variations of the quantity x.

The modulator gain does not usually depend on the frequency, and is fixed inside the control integrated circuit.

Although dc-dc converters are strongly non-linear system just because of the switching action, with suitable approximations and under certain hypothesis, their frequency response may be described and represented by the same means used for linear networks and, therefore, by a transfer function characterized by gain, zeroes and poles. This transfer function depends on the converter topology, i.e., the mutual configuration of the elements handling the power, on its operation mode, i.e., whether, at every switching cycle, there is a continuous current circulation in the magnetic part (Continuous Current Mode, CCM) or not (Discontinuous Current Mode, DCM), and on the quantity x controlled by the control loop. While in PWM converters different control methods are commonly used—traditionally, in resonant converters, the quantity used to control the converter is directly the switching frequency of the square wave applied to the resonant circuit.

Figure 2:
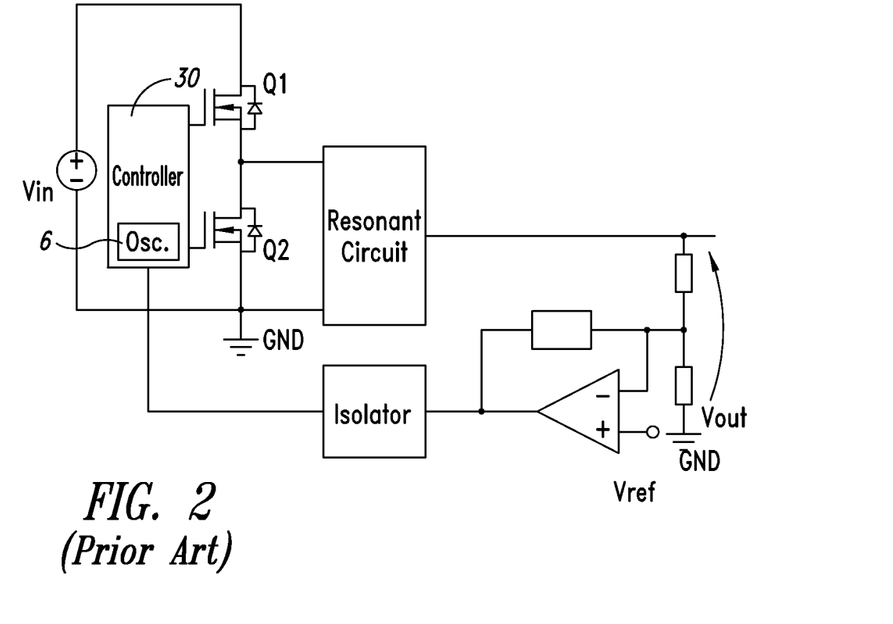
FIG. 2 shows a block schematic of a resonant converter with adjustment of the output voltage in accordance with the prior art.

In all integrated control circuits for dc-dc resonant converters available in the market, the control directly operates on the oscillation frequency of the half bridge (Direct Frequency Control, DFC). FIG. 2 shows a control system for this type of resonant converter. The output of the error amplifier 4 on the secondary side, having a part of the output voltage Vout at the input of the inverting terminal and a reference voltage Vref on the non-inverting terminal, is transferred to the primary side by an isolator 50, for example a photocoupler, so as to ensure the primary-secondary isolation required by the safety regulations, and acts upon a voltage-controlled oscillator (VCO) 6 or a current-controlled oscillator (ICO) inside the control integrated circuit 30.

This type of control arises two classes of problems. A first one relates to the fact that, unlike PWM converters, dynamic small-signal models for resonant converters expressed in terms of gain, poles and zeroes are not known in the literature (there are some approximated forms of questionable practical use). In other words, the transfer function of the power stage is not known. A second class of problems relates to the fact that, according to study results based on simulations, said transfer function of the power stage shows a strongly variable dc gain, and a number of poles varying from one to three and with a very mobile position, depending on the operating point. There is finally a zero due to the output capacitor.

The large gain variation and the highly variable pole configuration make the frequency compensation of the feedback control loop quite problematic. As a result, it is virtually impossible to obtain a transient response optimized under all the operating conditions, and a considerable trade-off between stability and dynamic performance occurs. Additionally, the energy transfer strongly depends on the input voltage (audio-susceptibility), so that the control loop has to significantly change the operating frequency to compensate said variations. Since in the input voltage of the converter there is an alternating component with a frequency twice that of the mains voltage, the loop gain at that frequency is quite high to effectively reject said alternating component and significantly attenuate the residual ripple visible in the output voltage.

All these factors risk to raise problems which may be not all solvable, especially when the load supplied by the converter has great dynamic changes and/or there are strict specifications on the dynamic accuracy, the response speed, or the rejection of the input ripple.

Finally, another problem related to the DFC control method is the sensitivity of the switching frequency to the value of the components in the resonant circuit (Cr, Ls and Lp). These values have a statistical spread due to their fabrication tolerances and this adversely affects the effectiveness of the protection circuits. In fact, generally speaking, to avoid that a converter may be operated abnormally, the control quantity x should be limited. In the case of resonant converters, the resonant controllers implementing DFC allow the operating frequency of the half bridge to be top and bottom limited. These limits should be set considering that, due to the above-mentioned value spread, the operating frequency range of the converter will change accordingly. The minimum limit set to the frequency should thus be lower than the minimum value which may be taken by the lower end of said range, and the maximum limit higher than the maximum value which may be taken by the higher end of said range. This significantly reduces the effectiveness of the frequency limitation as a means for preventing abnormal operational conditions.

BRIEF SUMMARY

One embodiment of the present disclosure is a control device of a resonant converter which is different from and simpler than the known ones.

One embodiment of the present disclosure is a control device for a resonant converter that is configured to convert an input signal into an output signal. The resonant converter includes a switching circuit adapted to drive a resonant circuit that includes at least one capacitor. The switching circuit includes at least a half bridge of first and second switches, the central point of said half bridge being connected to said resonant circuit. The control circuit includes a comparison circuit configured to produce a comparison signal by comparing a signal representative of the energy of the resonant circuit with at least another signal; and a driver circuit configured to generate a control signal for controlling a switching circuit of the resonant converter based on the comparison signal.

The another signal may be a predetermined signal or a signal responsive to the an output quantity of the converter.

BRIEF DESCRIPTION OF THE SEVERAL VIEWS OF THE DRAWINGS

The features and advantages of the present disclosure will become apparent from the following detailed description of some embodiments thereof, illustrated only by way of non-limitative examples in the annexed drawings, in which.

DETAILED DESCRIPTION

Figure 3:
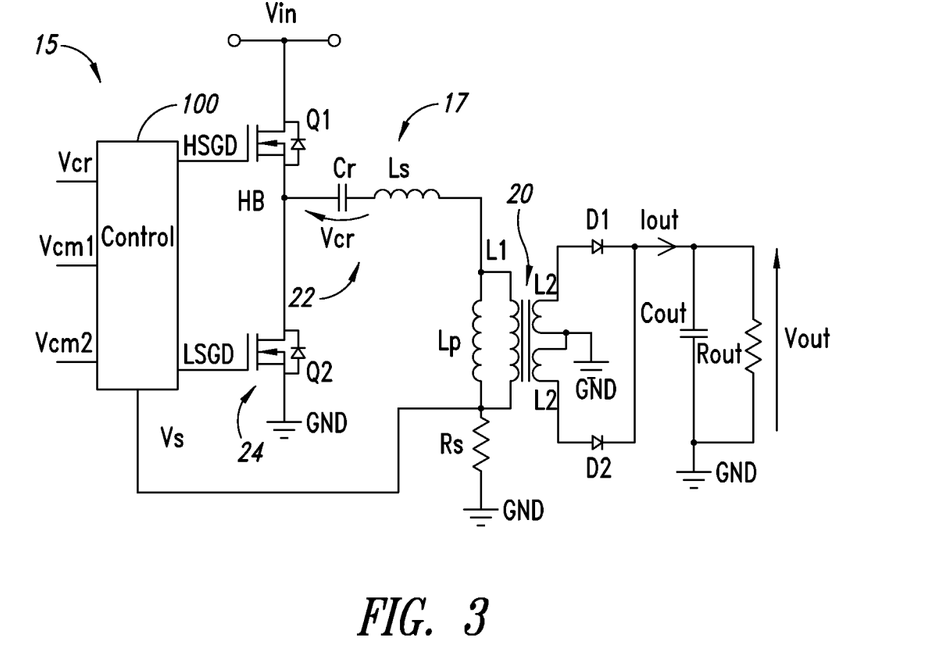
FIG. 3 shows a circuit schematic of a resonant converter with the control device in accordance with a first embodiment of the present disclosure.

FIG. 3 shows a circuit schematic of a resonant converter 15 with a control device 100 in accordance with a first embodiment of the present disclosure. The converter comprises a resonant circuit 17 preferably comprising a transformer 20, with a primary winding L1 and a secondary with two windings L2, and an LLC filter 22 comprising the inductors Ls and Lp and the capacitor Cr. The primary winding L1 is arranged in parallel with the inductor Lp and the parallel is connected to a terminal of a switch of the resonant converter 15 by the inductor Ls and the capacitor Cr. In one embodiment, the switch is a half bridge 24 that includes transistors Q1 and Q2 coupled between a first supply terminal 26, configured to receive a supply voltage Vin, and a second supply terminal 28 configured to be coupled to ground GND. The transistors Q1 and Q2 are coupled to one another at a central point HB that is coupled to the capacitor Cr of the LLC filter 22. The parallel of the primary winding L1 and the inductor Lp is also connected to a sense resistance Rs connected to ground GND. The two windings L2 of the secondary are connected between ground GND and anodes of two diodes D1 and D2 having cathodes in common and connected to the parallel of a resistance Rout and a capacitor Cout connected to ground GND. Transistors Q1 and Q2 are preferably MOS transistors, particularly NMOS transistors; the drain terminal of the transistor Q2 is in common with the source terminal of the transistor Q1 and is the central point HB of the half bridge 24.

The control device 100 has at one input a signal Vcr representative of the energy of the resonant circuit, particularly representative of the energy of the capacitor Cr of the resonant circuit of the converter, more preferably the voltage Vcr across the capacitor Cr. The control device 100 has at least one input that receives at least one signal Vcm1, Vcm2, but preferably has two inputs that respectively receive signals Vcm1 and Vcm2. The control device 100 has at input also the voltage Vs across the sense resistance Rs through which the current Iin of the resonant circuit flows.

Preferably, according to a first embodiment of the disclosure, the signals Vcm1 and Vcm2 are predetermined signals or external signals, with Vcm1>Vcm2. The control device 100, visible in more detail in FIG. 4, comprises preferably a multiplier 200 adapted to multiply the signal Vcr, that is the voltage across the capacitor Cr, by 1/K, wherein K is preferably a constant but even a parameter variable from outside. The signal Vcr/K is sent to the non-inverting input of the PWM comparator 201 and to the inverting input of the PWM comparator 202. The signal Vcm2 is at the non-inverting input of the PWM comparator 202 while the signal Vcm1 is at the inverting input of the PWM comparator 201. Therefore the signal Vcr, that is the voltage across the capacitor Cr, is directly compared with the signals Vcm1 and Vcm2. The output signals HS, LS of the PWM comparators 201 and 202 are at respective first inputs of OR gates 260 and 261 having respective second inputs that respectively receive respective output signals of a zero crossing detector 300 configured to detect a zero crossing of the signal Vs across the sense resistance Rs. The zero crossing detector 300 preferably comprises two comparators 250 and 251; the comparator 250 is able to compare the voltage Vs across the resistance Rs with a predetermined voltage Vsn while the comparator 251 is able to compare the voltage Vs across the resistance Rs with a predetermined voltage Vsp; the voltages Vsp and Vsn are voltages close to ground GND, for example of 0.5 Volt and −0.5 Volt. The output signals of the OR gates 260 and 261 are respectively provided to respective inputs of a driver 400 configured to generate the control signals HSGD, LSGD that respectively control the switches Q1 and Q2.

Figure 4:
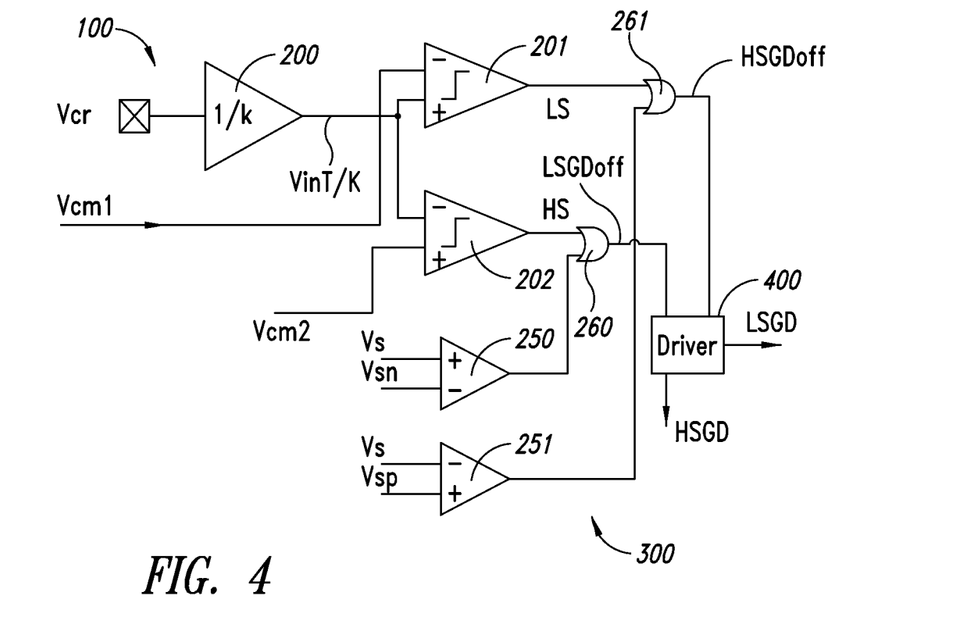
FIG. 4 shows a circuit schematic of the control device in FIG. 3.

Therefore the control device 100 employs the signal Vcr that reaches a certain value naturally, due to the current Iin flowing in the resonant circuit 17. Anyway if a too large value of the control signal is imposed, the current Iin in the resonant circuit 17 will invert its sign before the Vcr target value, so the voltage Vcr will no more grow and will not reach the desired value to have a commutation. This can be viewed also from the point of view of the DFC: it is well known that there is a lower limit of the switch frequency at which the voltage gain continues to rise. This is also the boundary of the unwanted capacitive operative mode. In this mode the soft switching behavior of the converter is no more present. This frequency limit is not a limit of the control strategy but is intrinsically fixed by the resonant circuit.

Considering the apparatus according to one embodiment of the present disclosure, to avoid this kind of operation and also a stall of the apparatus, when the resonant current inverts its flow before the reaching of the switching threshold, a commutation is forced. In this way the system works at constant energy, that is also the maximum energy reachable with that tank and circuit. More precisely the switching should be forced slightly before the inversion of the current flow, to have enough current to ensure the soft switching of the HB node; let's say when Vs crosses (rising) the Vsn value (a slightly negative value) and crosses (falling) the Vsp value (slightly positive value).

Figure 5:
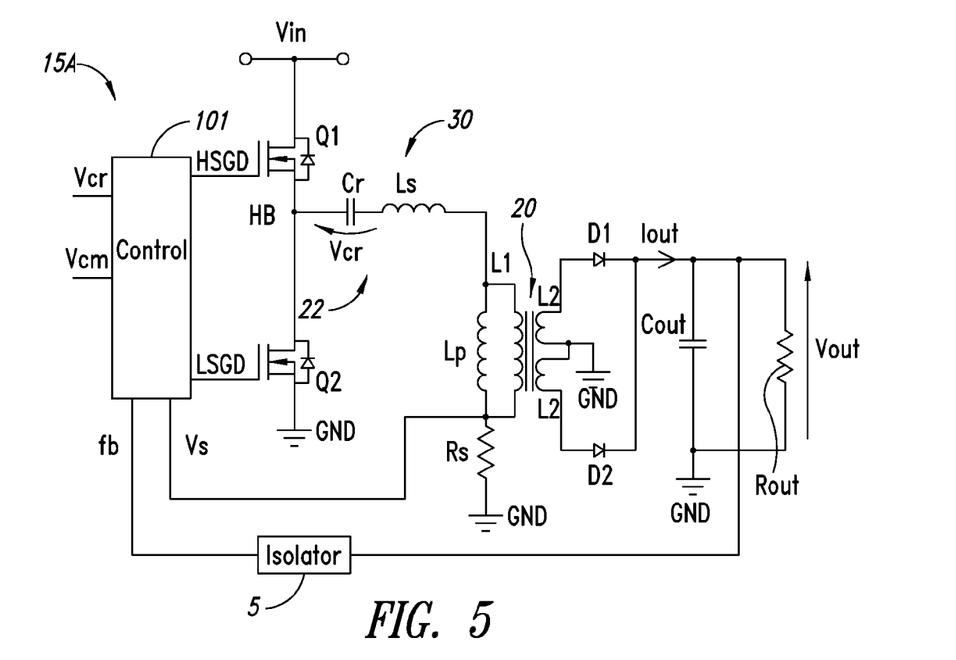
FIG. 5 shows a circuit schematic of a resonant converter with a control device in accordance with a second embodiment of the present disclosure.

FIG. 5 shows a circuit schematic of a resonant converter 15A with a control device 101 in accordance with a second embodiment of the present disclosure. The converter comprises the resonant circuit 17 preferably comprising the transformer 20 with the primary winding L1 and the secondary with the two windings L2 and the LLC filter 22 comprising the inductors Ls and Lp and the capacitor Cr. The primary winding L1 is arranged in parallel with the inductor Lp and the parallel is connected to a terminal of a switch of the resonant converter by the inductor Ls and the capacitor Cr. In one embodiment, the switch is the half bridge 24 that includes transistors Q1 and Q2 coupled between the first supply terminal 26, configured to receive the supply voltage Vin, and the second supply terminal 28 configured to be coupled to ground GND. The transistors Q1 and Q2 are coupled to one another at the central point HB that is coupled to the capacitor Cr of the LLC filter 22. The parallel of the primary winding L1 and the inductor Lp is connected to the sense resistance Rs connected to ground GND. The two windings L2 of the secondary are connected between ground GND and the respective diodes D1 and D2 whose cathodes are connected in common and connected to the parallel of the resistance Rout and the capacitor Cout connected to ground GND. Transistors Q1 and Q2 are preferably MOS transistors, particularly NMOS transistors; the drain terminal of the transistor Q2 is in common with the source terminal of the transistor Q1 and is the central point HB of the half bridge 24.

The control device 101 has a first input configured to receive the signal Vcr representative of the energy of the resonant circuit, particularly representative of the energy of the capacitor Cr of the resonant circuit of the converter, more preferably the voltage Vcr across the capacitor Cr. The control device 101 has additional inputs configure to receive at least one external signal Vcm and a feedback signal fb, that is a voltage or current signal, indicative of an output quantity of the converter 15A. The block 5 is an isolator adapted to form the output quantity on the base of the output voltage Vout or the output current Iout of the converter and is adapted to transfer the output quantity to the primary side by providing the feedback signal fb.

Figure 6:
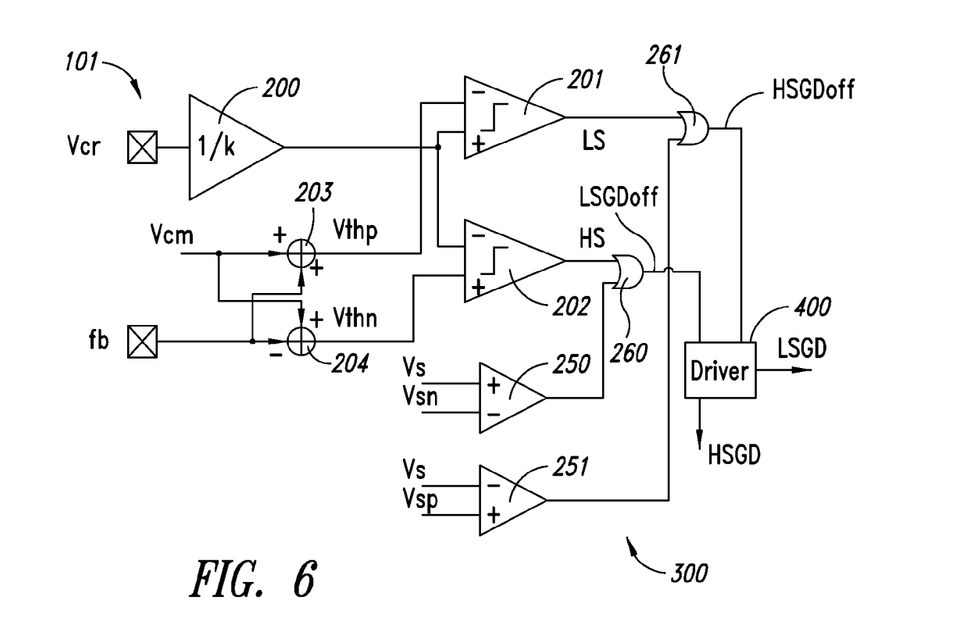
FIG. 6 shows a circuit schematic of the control device in FIG. 5.

An embodiment of the control circuit 101 is shown in detail in FIG. 6. The control circuit 101 includes a first adder 203 that adds the signal fb to the signal Vcm to generate a first threshold Vthp and includes a second adder 204 that subtracts the signal fb from the signal Vcm to generate a second threshold Vthn, with Vthp>Vthn. The control device 101 comprises the multiplier 200 adapted to multiply the signal Vcr, that is the voltage across the capacitor Cr, by 1/K, wherein K is preferably a constant but even a parameter variable from outside. The signal Vcr/K is sent to the non-inverting input of the PWM comparator 201 and to the inverting input of the PWM comparator 202. The threshold Vthn is provided to the non-inverting input of the PWM comparator 202 while the threshold Vthp is provided to the inverting input of the PWM comparator 201. Therefore the signal Vcr, that is the voltage across the capacitor Cr, is directly compared with the signals Vthp and Vthn.

The output signals HS, LS of the PWM comparators 201 and 202 are respectively provide to respective first inputs of OR gates 260 and 261 having respective second inputs that respectively receive the respective output signals of the zero crossing detector 300 configured to detect zero crossings of the signal Vs across the sense resistance Rs. The zero crossing detector 300 preferably comprises the comparators 250 and 251; the comparator 250 is able to compare the voltage Vs across the resistance Rs with a predetermined voltage Vsn while the comparator 251 is able to compare the voltage Vs across the resistance Rs with a predetermined voltage Vsp; the voltages Vsp and Vsn are voltages close to ground GND, for example of 0.5 Volt and −0.5 Volt. The output signals of the OR gates 260 and 261 are respectively provided to the respective inputs of the driver 400 configured to generate the control signals HSGD, LSGD that respectively control the switches Q1 and Q2.

When the signal Vcr/K is lower than the threshold Vthn, the signal LSGD is low, the transistor Q2 is off and the signal HSGD is high and therefore the transistor Q1 is on. When signal Vcr/K is higher than the threshold Vthp, the signal HSGD is low and immediately switches the transistor Q1 off, but transistor Q2 which should switch on still remains switched off for a time Td due to the action of the dead time generator block (not visible). This block maintains the signal LSGD low for a time Td; this delay is used, upon switching Q1 off, to let the voltage of the node HB (midpoint of the half-bridge) go to zero. In this way, when transistor Q1 is switched off the drain-source voltage thereof is substantially zero. The same obviously occurs during the opposite transition, between switching off the transistor Q2 and switching on the transistor Q1. This is the soft-switching mechanism that eliminates switching losses at turn-on. The time Td may be internally fixed or adapted to the transition speed of the midpoint voltage by appropriate control systems.

Therefore, after elapsing the time Td, the signal LSGD is will be high and the transistor Q2 is switched on.

Figure 7:
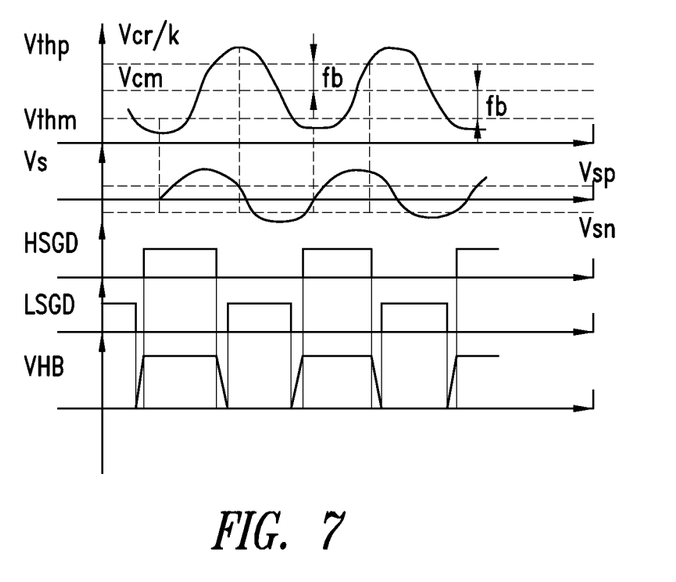
FIG. 7 shows some time diagrams of signals involved in the device of FIG. 5.

FIG. 7 shows the time diagrams of the signals Vcr/K, Vcm, Vthp, Vthn, HSGD, LSGD and VHB (the voltage at the node HB) related to the control device in FIGS. 5 and 6.

With the control device 100, 101 according to the first and second embodiments of the present disclosure the power is transferred from the source to the circuit in each half cycle.

In fact, considering the situation wherein the switch Q1 is turned on and the switch Q2 is turned off, a current Iin flows from the voltage source Vin to the resonant circuit 17 in the time interval t2−t1. The energy Ein provided by the input voltage source Vin in the time interval t2−t1 is: Ein=Pin*dt= (Vin*Iin)*dt, where dt=t2−t1. As the current Iin flows through the capacitor Cr, the voltage Vcr=Iin*dt/Cr, and the energy Ein=Vin*Cr*ΔVcr where ΔVcr=Vcr(t2)−Vcr(t1).

Assuming that the converter is not dissipative, all the energy supplied by the voltage source Vin to the converter is then delivered to the load, in term of average. The switching circuit Q1, Q2 switches when Vcr is equal to Vcm2 or Vcm1; in this way at every switching cycle the resonant circuit is forced to take from the source Vin the energy Ein=Vin*Cr* (Vcm1−Vcm2). This energy will be then delivered to the load.

In this case, the voltage source Vin provides energy only when the transistor Q1 is on. In the other cycle, the energy flow is due to the voltage accumulated across the capacitor Cr. It can be assumed, without any lack of generality, that the converter is powered by two voltage sources Vin/2 and −Vin/2, and a voltage equal to 0V is present across the capacitor Cr. So from the point of view of DC equation, it can be written:

Ein=Vin/2*Cr*K*(Vcm1−Vcm2) at every half cycle and the output energy Eout=Ein=Vout*Iout*dt where VoutNin=K*Cr*(Vcm1−Vcm2)/(2*Iout*dt) and since dt is the half of the period of the switching cycle and considering H(f)=Vout/Vin it occurs H(f)/f=K*Cr*(Vcm1−Vcm2)/Iout. This quantity is not a degree of freedom, but is defined by the transfer function H(f) of the resonant circuit 17, and normally it has small variation in the useful operative range of the converter.

From the equations it comes up that the quantity (Vcm1−Vcm2) rises if the load rises. To better accommodate larger variations of load, the factor K can changes between discrete values; in this way (Vcm1−Vcm2) can be maintained in a reasonable voltage range because the K acts as a scaling factor.

Also this converter may be used as an amplifier in a simpler way compared to the one with the DFC control, where the (Vcm1−Vcm2) is the quantity to amplify. If the output load is a resistive load Rout it occurs Iout=Vout/Rout and:

$$V\text{out}=\text{sqrt}(V\text{in}*K*Cr*(V\text{cm}1-V\text{cm}2)*R\text{out}*f),$$

where f is the switching frequency that the system will naturally use to transfer the desired amount of energy.

Since for this kind of use, the converter works in a zone where the gain can have a large variation, this happens also where the gain changes abruptly with the frequency; so we can assume that the frequency will be almost constant. With this assumption, the distortion introduced by the system loaded with a resistor, is a square root distortion, plus a little amount due to the frequency term f. In some case it can be tolerated, otherwise it can be compensated by a pre-distortion or a feedback amplifier, in a much more easy way compared to a DFC system (because the distortion is smaller).

About the transient behavior, considering a generic system Y(s)=H(s)*X(s) modeled in the s domain, the presence of poles in the transfer function clearly shows a presence of state variables that affect the value y when a perturbation of x happens.

This is true, regardless the physical meaning of the mathematical quantities y and x.

In the situation where a commutation is forced when a well-defined energy level is reached in the resonant circuit, no more state variables are present, even if the resonant circuit is composed by an arbitrary number of capacitors and inductors. Clearly this is true until the system is considered in term of energy transferred at every cycle dependently by the control voltage signal.

The system described provides a measure of the energy of the only resonant capacitor, but has been observed that this energy is representative of the energy of the overall resonant circuit in every operational mode. In this condition there is an almost system without memory which delivers energy from input voltage source to the output dependently by control voltage signal. Considering the output voltage as output signal, there is the action of the filtering capacitor that introduces a state variable, that is the only pole of the system.

Also the traditional DFC systems at the start up are forced to work at the highest possible switching frequency, to reduce the energy transfer and so to avoid overcurrent phenomena. This often leads to a slow startup phase, just to have enough margin to avoid anomalous conditions. The control strategy according to the present disclosure, since it works in term of energy, avoid intrinsically this risk, because the energy transfer is directly controlled. No over-currents can occur and the switching frequency will be the proper one to deliver the wanted energy.

Figure 8:
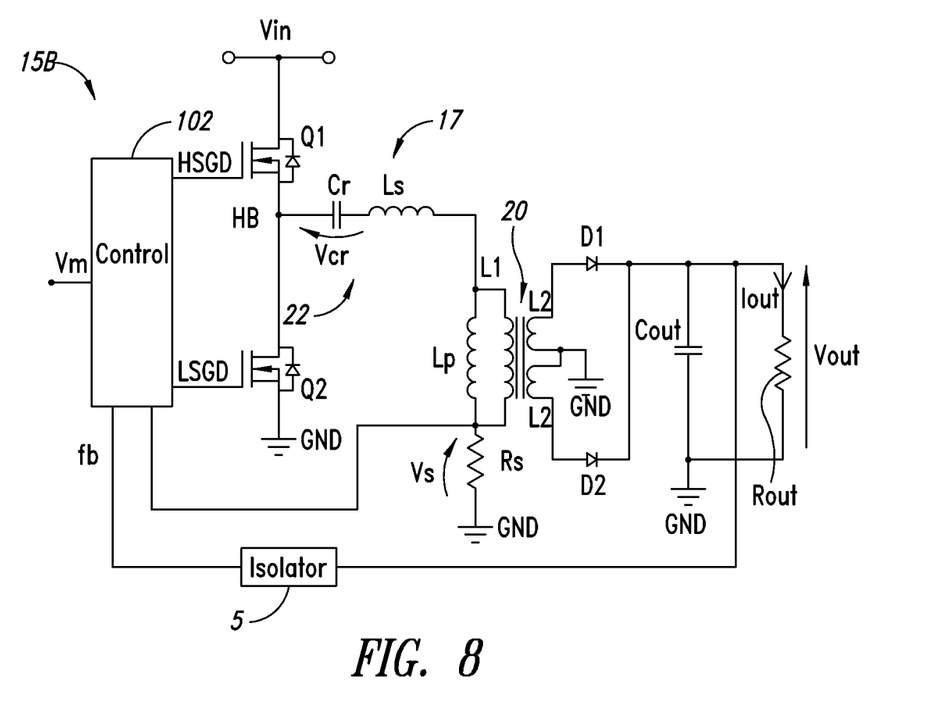
FIG. 8 shows a circuit schematic of a resonant converter with a control device in accordance with a variant of the first and the second embodiments of the present disclosure.

FIG. 8 shows a circuit schematic of a resonant converter 15B with a control device 102 in accordance with an embodiment of the present disclosure. The converter 15B in FIG. 8 differs from the converter 15A in FIG. 5 by the use of the voltage Vs at the terminals of the sense resistance Rs is at an input of the control device 102 in the place of the voltage Vcr.

Figure 9:
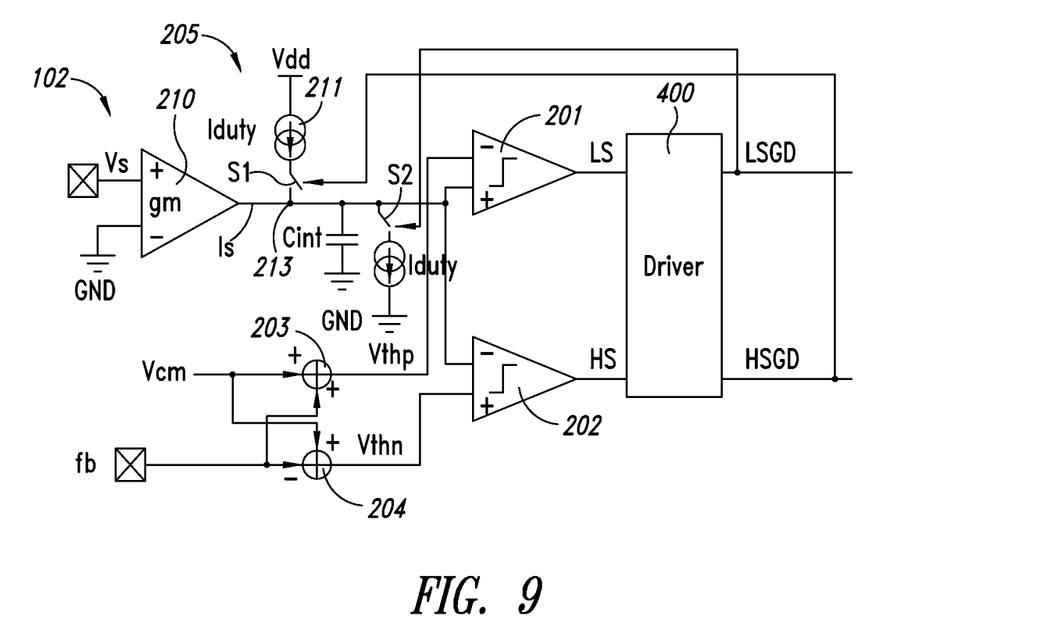
FIG. 9 shows a circuit schematic of the control device in FIG. 8.

According to an embodiment of the disclosure, the control device 102 comprises, as shown in FIG. 9, an operational transconductance amplifier 210 having a first input connected to receive the sense voltage Vs and a second input coupled to ground. The transconductance amplifier 210 is adapted to amplify by a factor gm the signal Vs at the first input to obtain a current Is which is integrated by a capacitor Cint to obtain a voltage Vint. The voltage Vint is sent to the non-inverting input of the PWM comparator 201 and to the inverting input of the PWM comparator 202. The threshold Vthn is at the non-inverting input of the PWM comparator 202 while the thresholds Vthp is at the inverting input of the PWM comparator 201. The output signals LS, HS of the PWM comparators 201 and 202 are respectively provided to inputs of a driver 400 adapted to generate the driving signals HSGD and LSGD for the transistors Q1 and Q2.

The control device 102 comprises a duty cycle control circuit 205 that, in one embodiment, is adapted to set a duty cycle of 50% for the control of the half bridge Q1, Q2. The duty cycle control circuit 205 includes first and second current generators 211, 212, each configured to generate a current Iduty, first and second switches S1, S2, an adder node 213, and a capacitor Cint. The current generator 211 is connected to the adder node 213 and the capacitor Cint by the switch S1, which is controlled by the signal LSGD in one half cycle. During that half cycle, the current Iduty is provided through the switch S1 to the adder node 213, which produces a current Is+Iduty, which is integrated by the capacitor Cint to produce the integrated voltage Vint that is provided to the comparators 201, 202. In the other half cycle during which the switch S2 is closed by the signal HSGC, the current generator 212 provides the current Iduty through the switch S2 to the adder node 213, which subtracts the current Iduty from the current Is. That current Is−Iduty is integrated by the capacitor Cint to produce the integrated voltage Vint. The current Iduty will have a not null contribution if the duty cycle is of 50%.

An integrated circuit comprising one of the control devices 100, 101, 102 shown in FIGS. 4, 6 and 9 for a switching converter in accordance with the present disclosure may be implemented. The circuit is integrated in a semiconductor chip.

The capacitor Cint will preferably be a component external to the integrated device comprising the control device 101 in accordance with the disclosure, and therefore connected to a special pin to provide the user with a calibration means of the time constant of the integration block.

Alternatively, the capacitor Cint may be integrated in the integrated circuit.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A control device for a resonant converter, comprising:
a comparison circuit configured to produce a comparison signal by comparing a signal representative of energy of a resonant circuit of the resonant converter with at least another signal, wherein said comparison circuit is configured to compare said signal representative of the energy of the resonant circuit with first and second signals, the first signal having a higher value than the second signal;
a driver circuit configured to generate a control signal for controlling a switching circuit of the resonant converter based on the comparison signal;
a first adder configured to form said first signal by adding a signal representative of an output quantity of the converter with a reference signal; and
a second adder configured to form said second signal by subtracting the signal representative of the output quantity of the converter from the reference signal.

2. The device according to claim 1, wherein said comparison circuit includes a zero crossing detector configured to produce a zero crossing detection signal by detecting that a signal representative of a current circulating in the resonant circuit crosses zero and the driver circuit is configured to generate said control signal in response to the zero crossing detection signal.

3. The device according to claim 2, wherein said zero crossing detector comprises a first comparator configured to compare said signal representative of the current circulating in the resonant circuit with a first reference signal higher than zero and a second comparator configured to compare said signal representative of the current circulating in the resonant circuit with a second reference signal lower than zero.

4. The device according to claim 1, further comprising an integrator configured to produce an integrated signal by integrating a current signal representative of current circulating in the resonant circuit, said integrated signal being the signal representative of the energy of the resonant circuit.

5. A control device for a resonant converter, comprising:
a comparison circuit configured to produce a comparison signal by comparing a signal representative of energy of a resonant circuit of the resonant converter with at least another signal;
a driver circuit configured to generate a control signal for controlling a switching circuit of the resonant converter based on the comparison signal; and
an integrator configured to produce an integrated signal by integrating a current signal representative of current circulating in the resonant circuit, said integrated signal being the signal representative of the energy of the resonant circuit, wherein said integrator is configured to integrate a summed current formed by adding said current signal representative of the current circulating in the resonant circuit and another current so as to set a duty cycle of 50% for the control of a half bridge of the resonant converter.

6. The device according to claim 5, wherein the integrator includes an adder node configured to produce the summed current and a capacitor configured to integrated the summed current.

7. The device according to claim 6, wherein the comparison circuit and driver circuit are part of an integrated circuit integrated on a semiconductor chip except that the capacitor is external to the integrated circuit.

8. The device according to claim 1, wherein said signal representative of the energy of the resonant circuit is a signal representative of a voltage across a capacitor of the resonant circuit.

9. A resonant converter for converting an input signal to an output signal, comprising:
a resonant circuit that includes a capacitor and a sense element configured to provide a signal representative of a resonant circuit current circulating in the resonant circuit;
a switching circuit configured to drive the resonant circuit, the switching circuit including a half bridge of first and second switches electrically coupled to each other at central point that is electrically coupled to said resonant circuit; and
a control device configured to control the switching circuit, the control device including:
a comparison circuit configured to produce a comparison signal by comparing a signal representative of energy of the resonant circuit with at least another signal; and
a driver circuit configured to generate a control signal for controlling the switching circuit based on the comparison signal, wherein:
said comparison circuit includes a zero crossing detector configured to produce a zero crossing detection signal by detecting that the signal representative of the resonant circuit current crosses zero and the driver circuit is configured to generate said control signal in response to zero crossing detection signal,
said zero crossing detector comprises a first comparator configured to compare said signal representative of the resonant circuit current with a first reference signal higher than zero and a second comparator configured to compare said signal representative of the resonant circuit current with a second reference signal lower than zero.

10. The resonant converter according to claim 9, wherein the resonant circuit comprises a transformer with a primary winding coupled to the capacitor and at least a secondary winding configured to drive a load.

11. The resonant converter according to claim 9, wherein said comparison circuit is configured to compare said signal representative of the energy of the resonant circuit with first and second signals, the first signal having a higher value than the second signal.

12. The resonant converter according to claim 11, comprising:
a first adder configured to form said first signal by adding a signal representative of an output quantity of the converter with a reference signal; and
a second adder configured to form said second signal by subtracting the signal representative of the output quantity of the converter from the reference signal.

13. The resonant converter according to claim 9, wherein the control circuit includes an integrator configured to produce an integrated signal by integrating a current signal representative of the resonant circuit current, said integrated signal being the signal representative of the energy of the resonant circuit.

14. A resonant converter for converting an input signal to an output signal, comprising:
a resonant circuit that includes a capacitor and a sense element configured to provide a signal representative of a resonant circuit current circulating in the resonant circuit;
a switching circuit configured to drive the resonant circuit, the switching circuit including a half bridge of first and second switches electrically coupled to each other at central point that is electrically coupled to said resonant circuit; and
a control device configured to control the switching circuit, the control device including:
a comparison circuit configured to produce a comparison signal by comparing a signal representative of energy of the resonant circuit with at least another signal;
a driver circuit configured to generate a control signal for controlling the switching circuit based on the comparison signal; and
an integrator configured to produce an integrated signal by integrating a current signal representative of the resonant circuit current, said integrated signal being the signal representative of the energy of the resonant circuit, wherein said integrator is configured to integrate a summed current formed by adding said current signal and another current so as to set a duty cycle of 50% for the control of the half bridge.

15. The resonant converter according to claim 14, wherein the integrator includes an adder node configured to produce the summed current and a capacitor configured to integrated the summed current.

16. The resonant converter according to claim 9, wherein said signal representative of the energy of the resonant circuit is a signal representative of a voltage across the capacitor of the resonant circuit.

17. A control method, comprising:
controlling a resonant converter configured to convert an input signal into an output signal and including a resonant circuit, having a capacitor, and a switching circuit configured to drive the resonant circuit, the controlling including:
producing a first comparison signal by comparing a signal representative of energy of the resonant circuit with at least another signal; and
generating a first control signal for controlling the switching circuit based on the first comparison signal, wherein the producing includes:
forming a first signal by adding a signal representative of an output quantity of the converter with a reference signal; and
forming a second signal by subtracting the signal representative of the output quantity of the converter from the reference signal, wherein the comparing includes comparing the signal representative of the energy of the resonant circuit with the first signal, the method including:
producing a second comparison signal by comparing the signal representative of the energy of the resonant circuit with said second signal; and
generating a second control signal for controlling said switching circuit, wherein the first and second control signals control the switching circuit cycle by cycle.

18. The device according to claim 3, wherein the first comparator is configured to produce a first comparison signal, the second comparator is configured to produce a second comparison signal, and the comparison circuit includes a third comparator configured to produce a third comparison signal based on a comparison of the signal representative of energy of the resonant circuit of the resonant converter with the first signal, and a fourth comparator configured to produce a fourth comparison signal based on a comparison of the signal representative of energy of the resonant circuit of the resonant converter with the second signal, the device further comprising:
  a first logic gate configured to produce a first control signal, for controlling a high side switch of the resonant converter, based on the first comparison signal and the third comparison signal; and
  a second logic gate configured to produce a second control signal, for controlling a low side switch of the resonant converter, based on the second comparison signal and the fourth comparison signal.

19. A control device for a resonant converter, comprising:
  a comparison circuit configured to produce a comparison signal by comparing a signal representative of energy of a resonant circuit of the resonant converter with at least another signal; and
  a driver circuit configured to generate a control signal for controlling a switching circuit of the resonant converter based on the comparison signal, wherein:
    said comparison circuit includes a zero crossing detector configured to produce a zero crossing detection signal by detecting that a signal representative of a current circulating in the resonant circuit crosses zero and the driver circuit is configured to generate said control signal in response to the zero crossing detection signal,
    said zero crossing detector comprises a first comparator configured to compare said signal representative of the current circulating in the resonant circuit with a first reference signal higher than zero and a second comparator configured to compare said signal representative of the current circulating in the resonant circuit with a second reference signal lower than zero.

20. The device according to claim 19, wherein:
  the first comparator is configured to produce a first comparison signal;
  the second comparator is configured to produce a second comparison signal; and
  the comparison circuit includes a third comparator configured to produce a third comparison signal based on a comparison of the signal representative of energy of the resonant circuit of the resonant converter with the first signal, and a fourth comparator configured to produce a fourth comparison signal based on a comparison of the signal representative of energy of the resonant circuit of the resonant converter with the second signal.

21. The device according to claim 20, further comprising:
  a first logic gate configured to produce a first control signal, for controlling a high side switch of the resonant converter, based on the first comparison signal and the third comparison signal; and
  a second logic gate configured to produce a second control signal, for controlling a low side switch of the resonant converter, based on the second comparison signal and the fourth comparison signal.

22. A resonant converter for converting an input signal to an output signal, comprising:
  a resonant circuit that includes a capacitor and a sense element configured to provide a signal representative of a resonant circuit current circulating in the resonant circuit;
  a switching circuit configured to drive the resonant circuit, the switching circuit including a half bridge of first and second switches electrically coupled to each other at central point that is electrically coupled to said resonant circuit; and
  a control device configured to control the switching circuit, the control device including:
    a comparison circuit configured to produce a comparison signal by comparing a signal representative of energy of the resonant circuit with at least another signal, wherein said comparison circuit is configured to compare said signal representative of the energy of the resonant circuit with first and second signals, the first signal having a higher value than the second signal;
    a driver circuit configured to generate a control signal for controlling the switching circuit based on the comparison signal;
    a first adder configured to form said first signal by adding a signal representative of an output quantity of the converter with a reference signal; and
    a second adder configured to form said second signal by subtracting the signal representative of the output quantity of the converter from the reference signal.

23. The resonant converter according to claim 22, wherein:
  the comparison circuit includes a zero crossing detector that includes first and second comparators, the first comparator being configured to compare said signal representative of the resonant circuit current with a first reference signal higher than zero and produce a first comparison signal, the second comparator being configured to compare said signal representative of the resonant circuit current with a second reference signal lower than zero; and
  the comparison circuit includes a third comparator configured to produce a third comparison signal based on a comparison of the signal representative of energy of the resonant circuit of the resonant converter with the first signal, and a fourth comparator configured to produce a fourth comparison signal based on a comparison of the signal representative of energy of the resonant circuit of the resonant converter with the second signal.

24. The resonant converter according to claim 23, further comprising:
  a first logic gate configured to produce a first control signal, for controlling a high side switch of the resonant converter, based on the first comparison signal and the third comparison signal; and
  a second logic gate configured to produce a second control signal, for controlling a low side switch of the resonant converter, based on the second comparison signal and the fourth comparison signal.

25. The method according to claim 17, comprising:
  producing an integrated signal by integrating a current signal representative of current circulating in the resonant circuit, said integrated signal being the signal representative of the energy of the resonant circuit, wherein producing the integrated signal includes integrating a summed current formed by adding said current signal representative of the current circulating in the resonant circuit and another current so as to set a duty cycle of 50% for the control of a half bridge of the switching circuit.

* * * * *